United States Patent

Stewich

[11] 4,231,062
[45] Oct. 28, 1980

[54] CHARGE-COUPLED DEVICE IMAGER SYSTEM

[75] Inventor: Max W. Stewich, Chelmsford, Mass.

[73] Assignee: RCA Corporation, New York, N.Y.

[21] Appl. No.: 964,387

[22] Filed: Nov. 28, 1978

[51] Int. Cl.³ .......................... H04N 3/15; H04N 7/18
[52] U.S. Cl. .................................... 358/109; 358/213
[58] Field of Search ............... 358/109, 212, 213, 205, 358/222

[56] References Cited

U.S. PATENT DOCUMENTS

| 2,929,293 | 3/1960 | Willey | 358/109 |
| 3,167,613 | 1/1965 | Millen | 358/205 |
| 3,723,642 | 3/1973 | Laakmann | 358/212 |
| 3,742,234 | 6/1973 | Laakmann | 358/109 |
| 3,851,096 | 11/1974 | Collins et al. | 358/213 |
| 4,013,832 | 3/1977 | Douglas | 358/212 |
| 4,152,725 | 5/1979 | Beckmann | 358/109 |

FOREIGN PATENT DOCUMENTS 2812323 9/1978 Fed. Rep. of Germany ........... 358/109

Primary Examiner—John C. Martin
Assistant Examiner—Joseph A. Orsino, Jr.
Attorney, Agent, or Firm—Samuel Cohen; Joseph D. Lazar; Raymond E. Smiley

[57] ABSTRACT

A charge-coupled device array, comprised of elements arranged in one or more columns, and a moving lens positioned between the array and object to be imaged on the array are incorporated in an imaging system such as an aerial reconnaissance camera. The lens is moved relative to the column(s) of the array at the same speed that signals in the array corresponding to what is imaged thereon translate along the elements thereof such that a given point of the object is imaged on each element of a column.

3 Claims, 3 Drawing Figures

CHARGE-COUPLED DEVICE IMAGER SYSTEM

BACKGROUND OF THE INVENTION

There is a need for aircraft-mounted reconnaissance cameras having wide angle capability for recording information from a relatively wide swath of the ground over which the aircraft passes. Conventionally such cameras have utilized photographic film and known lensing techniques.

A charge-coupled device (CCD) one dimensional array has been utilized with the array oriented cross-track, i.e. at substantially right angles, to the direction of flight. Conventionally available CCD arrays comprise only a few hundred elements, although several thousand elements are necessary to provide the combination of acceptable resolution and wide angle capability. Several arrays are placed end to end to provide a desired resolution and wide angle capability. Associated with each array is a separate imaging lens, each lens being of a different focal length. The combination of lenses and arrays is such that the arrays are optically abutted. That is, a point on the ground which is adjacent to a point to be imaged on the last element of an array, n, will be imaged on the first element of the next array, n+1. The hardware for accomplishing this task is complex and costly. Further, after a given segment of the ground is imaged on the CCD array, the electronic signals contained therein must be quickly translated along and out of the arrays to some storage or other utilization device so that successive segments of the ground may be imaged on the arrays if acceptable along-the-track resolution is to be achieved. Thus, the lenses must be capable of passing a given amount of light to the array in a relatively short time, which requires the lenses to have low relative apertures such as f/1.5. Such lenses are costly to manufacture.

SUMMARY OF THE INVENTION

A system providing electronic signals representative of an image of an object comprises in combination a CCD array, a moveable lens position to image the object on the array and means for moving the lens relative to the array. The array is one having m columns each of n elements, where each column is coupled to an output terminal. The lens is moved along the elements of the array and a means is provided for an electronically translating signals along the elements of the array towards the output terminals thereof at the same speed that the image is moved along the elements.

DETAILED DESCRIPTION OF THE PREFERRED EMBODIMENT

Figure 1:
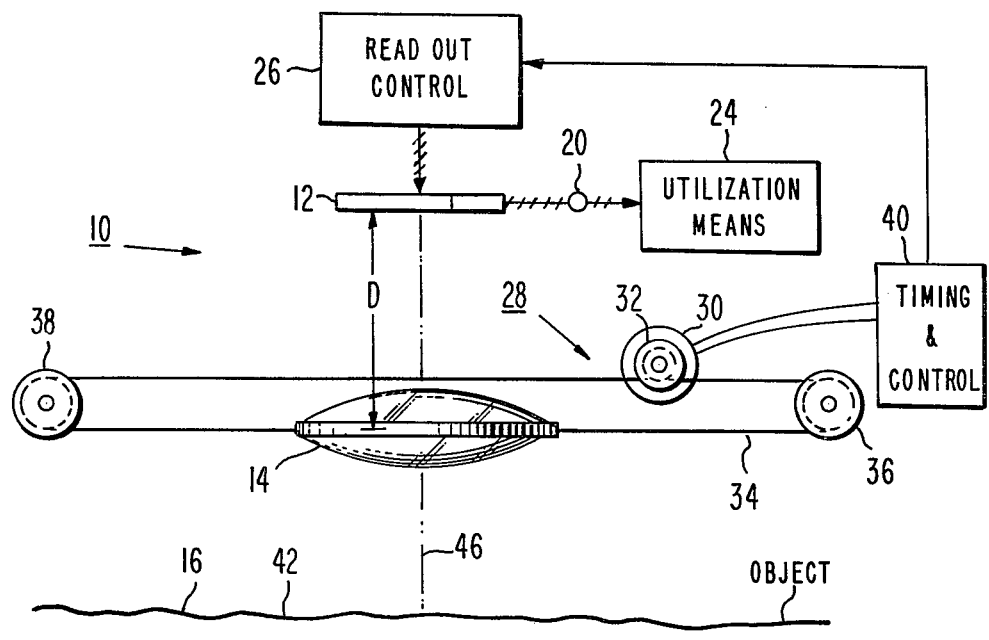
FIG. 1 is an elevation view in mechanical and electrical block diagram form of an aerial reconnaissance camera incorporating the present invention.
Figure 2:
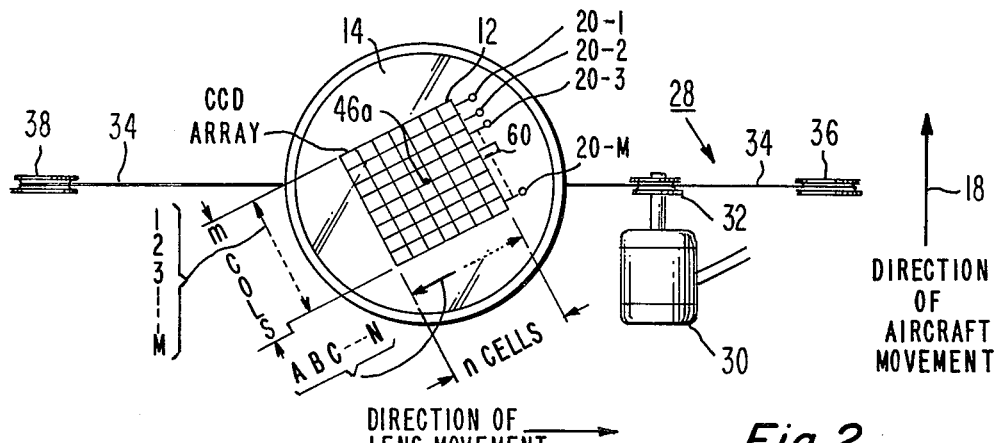
FIG. 2 is a plan view of the mechanical portions of the aerial reconnaissance camera of FIG. 1.

In FIGS. 1 and 2, a wide angle airborne reconnaissance camera system 10 utilizes a charge-coupled device (CCD) array 12 and lens 14 positioned relative to one another to image an object 16, such as the ground on the CCD array. Camera 10 is typically mounted in a moving platform such as an aircraft or satellite (not illustrated) for movement over object 16. In FIG. 1, the movement or track of the platform carrying system 10 is in a direction out of the drawing. In FIG. 2, which is a plan view from the object (not shown in FIG. 2) looking up into the camera system 10 movement or track of the system 10 is in the direction of arrow 18. CCD array 12, as best illustrated in FIG. 2, comprises m columns labeled 1, 2, 3, ... M. Each column is comprised of n cells labeled A, B, C, ... N. Each column of the array is coupled to a respective output terminal 20-1, 20-2, ... 20-M.

The columns of array 12 extend generally in the cross-track direction, that is, substantially normal to the direction of platform movement. One suitable CCD array is Model SiD51232 CCD Imager commercially available from the RCA Corporation. For a detailed description of such a CCD array see U.S. Pat. No. 4,032,976 issued June 28, 1977 to P. A. Levine.

In the Model SiD51232 Imager, an additional CCD array is provided, which translates signals received at the various output terminals 20-1, 20-2, etc. to a single output terminal at the one end of the additional array. In the aforementioned imager no terminals corresponding to 20-1, 20-2, etc. are available at the circuit pins thereof; they are hardwired internally to the additional array. As illustrated in FIG. 1, the terminals 20 (illustrated as a signal terminal 20) are coupled to a suitable utilization means 24.

A read-out control circuit 26 is coupled to array 12 for read-out of the information contained therein. A detailed description of such read-out control is contained in the aforementioned U.S. Pat. No. 4,032,976 and will not be repeated herein except as required for an understanding of the operation of the aerial reconnaissance camera. The read-out control causes signals to be passed from one cell to the next in each of the m columns toward terminals 20 for reasons to be discussed below.

Lens 14 is coupled to a means 28 for creating relative motion between the lens and CCD array 12. As illustrated the lens is moveable. Alternatively the lens could be fixed and the CCD array could move. Means 28 comprises a motor 30, such as a servo motor, to which is attached a pulley 32. A wire or a cable 34 is wound around the motor pulley and also to fixed pulleys 36 and 38. Cable 34 is also attached by suitable means to lens 14. The motion of motor 30 is under control of a timing and control circuit 40.

The arrangement of means 28 and timing and control means 40 is such that lens 14 is moved across the array 12 at the same rate that signals are translated from one cell to the next in each column under read-out control 26. For example, a given point 42 on object 16 is imaged on each cell of a given column in an additive manner. That is, point 42 is imaged, for example, on cell A in column 1 (cell 1-A which is the cell in the upper left corner of array 12, FIG. 2). Then as the contents of cell 1-A are translated to cell 1-B lens 14 is also moved such that point 42 is imaged on cell 1-B. As the contents of cell 1-B are translated to cell 1-C lens 14 is also further moved so that point 42 is imaged on cell 1-C, etc. In like manner, point 42, is imaged on cell 1-D, etc. Accordingly, point 42 is imaged on all cells of column 1.

Such "traveling integration" as this operation is termed, has two advantages. The first advantage is that a large numeric aperture lens 14, such as f/8 is sufficient to transfer all the light necessary from object 16 to the CCD array since the illumination of the array by each point on the object lasts for a relatively long time due to the time required for a point to be imaged on all elements of an array column. Furthermore, a large numeric aperture lens provides a greater depth of field of sharp focus over a wider field angle than does a lower numeric aperture lens as described hereinabove in the Background of the Invention section.

The second advantage is that quality variations from one cell to the next have no effect on the quality of the signal which ultimately emanates from an output terminal 20 since a point on the ground is sequentially imaged on all cells of a column.

Figure 3:
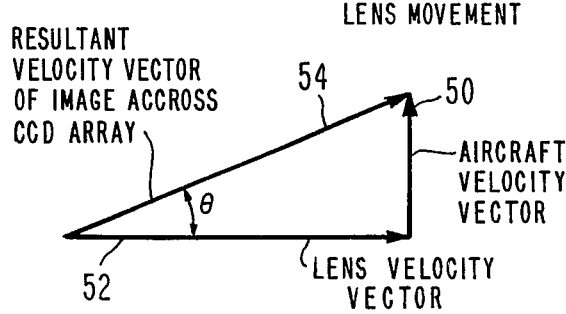
FIG. 3 is a vector diagram useful in understanding the operation of the camera of FIGS. 1 and 2.

As described previously, camera system 10 is mounted in a moving platform such as an aircraft or satellite. Referring to FIG. 3, it will be observed that with a given aircraft velocity vector such as 50 and a given lens 14 velocity vector 52, the resultant vector 54 of the image across CCD array 12 is illustrated by vector 54.

Thus, CCD array 12 must be pointed at an angle $\theta$ relative to the direction of lens movement to permit a given object point to image on all CCD elements of one column. This positioning may be accomplished by rotating array 12 about axis 46a corresponding to center line 46 (FIG. 1) by a handle 60 or by some other appropriate means such as an automated means coupled to the ground speed indicator of the platform.

Operation of the reconnaissance camera of FIG. 1 and FIG. 2, will now be described with the initial assumption that lens 14 is positioned left of center line 46 (FIG. 1) and that the angular position (by angle $\theta$) of CCD array 12 is preset giving due consideration to the speed of movement of the platform. Then read-out control 26 under control of timing and control 40 causes whatever information is contained in CCD array 12 to translate at a given fixed speed from element to element in each column toward output terminals 20-1, 20-2, etc. and thence to utilization means 24 in the manner described in aforementioned U.S. Pat. No. 4,032,976. Simultaneously control means 26 causes lens 14 to translate from the left to the right of center line 46 (relative to the arrangement shown in FIG. 1) also under control of timing and control 40. The speed of movement of lens 14 is arranged to coincide with the speed of transfer of information from cell to cell in array 12, such that a given point on the ground is imaged on all of the n cells of an array column and successive points along the flight path are imaged on successive ones of the m columns of the array 12. Since array 12 contains m columns, a strip of ground relatively wide in the along track direction may be imaged on array 12 at one time. The amount of ground covered in the along track direction of the aircraft depends on the altitude of the aircraft above the ground and on the resolution of the along track direction required of the camera. When lens 14 has moved to the right as illustrated in FIG. 1, while aircraft motion in direction 18 (FIG. 2) is occurring, the lens is moved back to the left side during the time that the aircraft transitions over the ground or other object 16 by an amount such that the lens 14 is moved in position to image on array column 1 information from the object immediately beyond that position which was previously imaged on the array column m.

It will be appreciated that the number of columns required of the array 12 is a function both of the speed of the platform and also of the speed with which the lens 14 can be returned to its starting position left of the center line 46. Thus, for example, if the platform speed were zero only a single column array would be necessary since lens 14 could move at any speed. Also the number of columns could be reduced if the lens 14 could move from right to left as illustrated in FIG. 1 in a small amount of time or if the required resolution in the along track direction is very low. However, since arrays with a relatively large number of columns are available, lens 14 can desirably return to it starting position relatively slowly.

What is claimed is:

1. A system for providing electronic signals representing an image of an object, said system comprising in combination:

means for producing relative motion between said object and said system in a first direction such that the distance between said system and said object remains substantially invarient;

a charge-coupled device array comprising m columns, each of n elements, each column being coupled to an output terminal where $m>1$ and $n>1$;

a lens positioned between said array and said object such that said array is in the focal plane of said lens;

means for producing relative motion between said lens and said array such that said array remains in the focal plane of said lens and said object is scanned in a second direction normal to said first direction such that points on said object along an imaginary line lying on said object in said second direction are imaged along the elements of a given array column, each of said points being imaged on each of said elements of said given column in succession, points along imaginary lines parallel to said first imaginary line being similarly imaged on various elements of various other columns of said array associated with said imaginary lines; and means coupled to said array for electronically translating signals contained in the elements thereof in respective columns from one element to the next along said respective columns at the same rate and direction that the image moves along said array such that a given point of said object is imaged serially on successive elements in a given column as a signal representative of said given point is stored in said successive elements, said direction that said image moves being toward the output terminals such that said electronic signals are translated thereto.

2. The combination as set forth in claim 1 further including utilization means coupled to said output terminals of said array for receiving therefrom signals reponsive to the image of said object as said signals are translated along said array.

3. The combination as set forth in claim 1, wherein said means for producing relative motion between said lens and said array comprises means for moving said lens while maintaining the rest of said system fixed.

* * * * *